Sept. 16, 1924.
K. J. E. HESSELMAN
INTERNAL COMBUSTION ENGINE
Filed Sept. 11, 1922   2 Sheets-Sheet 1
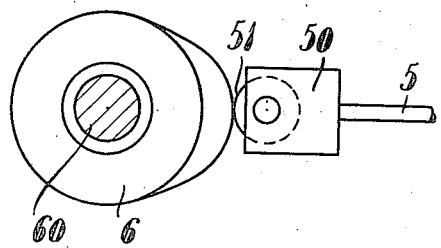
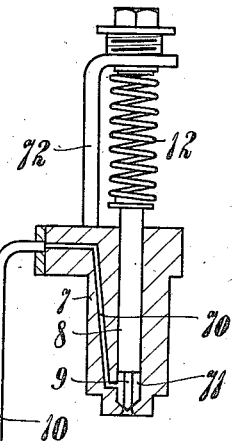
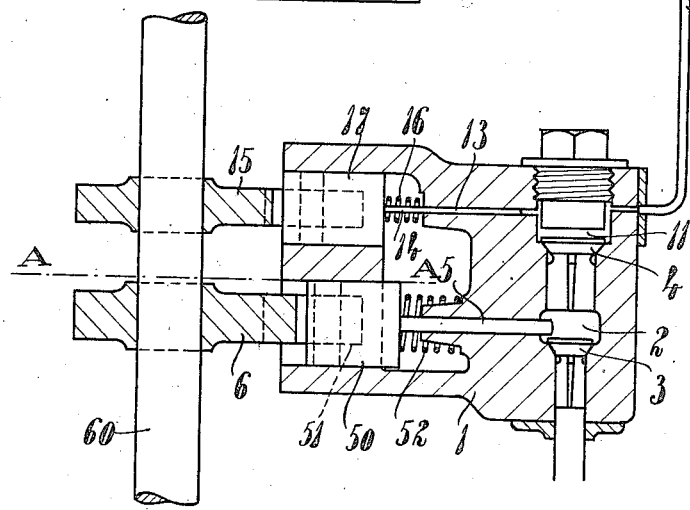

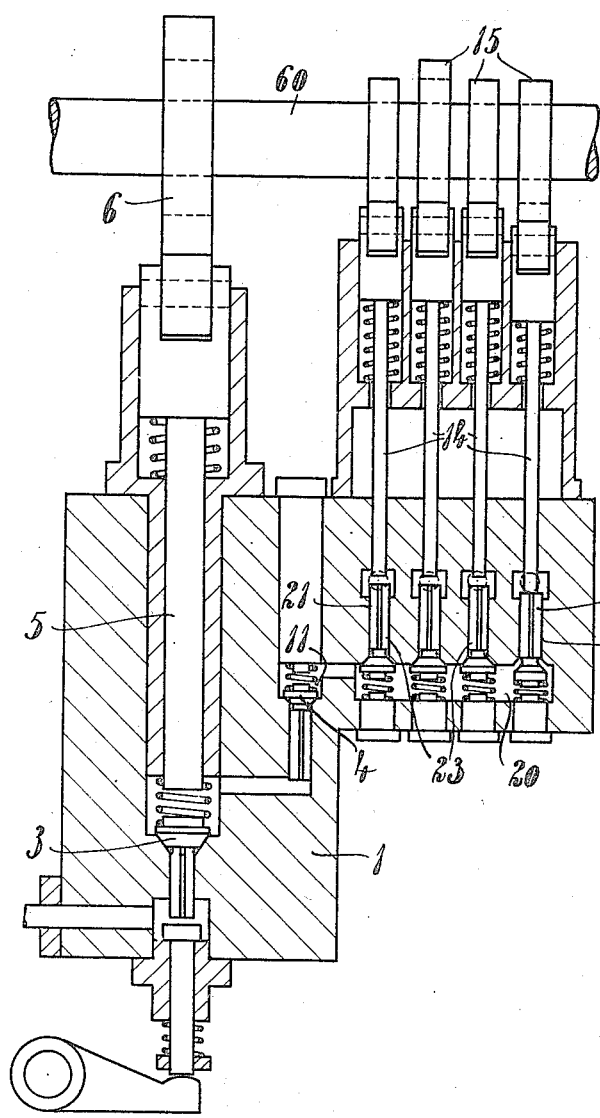

Patented Sept. 16, 1924.

1,508,656

UNITED STATES PATENT OFFICE.

KNUT JONAS ELIAS HESSELMAN, OF SALTSJO-STORANGEN, SWEDEN.

INTERNAL-COMBUSTION ENGINE.

Application filed September 11, 1922. Serial No. 587,471.

*To all whom it may concern:*

Be it known that I, KNUT JONAS ELIAS HESSELMAN, a citizen of the Kingdom of Sweden, residing at Saltsjo-Storangen, Sweden, have invented new and useful Improvements in Internal-Combustion Engines, of which the following is a specification.

In internal combustion oil engines in which the oil is injected directly by means of a pump through a spring controlled automatic valve, it has proved difficult to obtain a reliable closing of said valve under all circumstances. The opening of such a valve takes place, as is well known, when the pressure existing in the discharge pipe of the pump has reached a value higher than the spring pressure tending to maintain the valve in closed condition. When the pump ceases to supply oil, the pressure within the discharge pipe will fall below that necessary for maintaining the valve open, and the valve closes. By appropriate design and dimensioning of the pump, the discharge pipe and the valve it is possible to control under normal conditions, the pressure remaining within the discharge pipe so that it will be below the opening pressure of the valve, whereby the valve will be pressed against its seat by a power corresponding to the difference between the spring pressure and the liquid pressure on the valve. The height of the pressure remaining within the discharge pipe, however, depends on very complicated dynamic conditions during the injection period and it is not possible to control such conditions so that said pressure will be appreciably below the opening pressure of the valve under all conditions. It should be noted that in order to secure a reliable tightening of a valve, it is possible to press the valve against its seat by a certain, not too small power, that is, a distinct reduction of pressure is absolutely necessary in the passage between the pump and the valve after the completion of the injection. As stated, it is not possible by dimensioning only to secure such a pressure reduction under all conditions. Especially at light load and slow running the injection will take place at such a slow speed and the speed of movement of the oil within the discharge pipe, that is of essential import for the pressure reduction, will be so low that no pressure reduction at all or only a too small pressure reduction is obtained.

It has been already proposed to completely remove the pressure from within the discharge pipe in the meantime between the injection periods by means of a separate valve, inserted between the discharge pipe and the suction pipe of the pump, said valve being so arranged as to open immediately after and to close immediately before the injection takes place. This will secure the attainment of the result desired, the arrangement, however, is connected with many inconveniences. The amount of oil to be impressed into the discharge pipe to effect an increase of the pressure therein to the opening pressure of the valve, is often of the same order of magnitude as the amount injected at each stroke, or may, in certain instances, be several times as large as said last mentioned amount, even at full load. If the discharge pipe is released from pressure, then the pump should first impress a large amount of oil to increase the pressure to the opening pressure and thereafter the, eventually, much smaller amount, necessary for the combustion within the cylinder. It is readily understood that under such conditions the exactness of the operation of the pump will leave a great deal to be desired, and it will, in fact, be impossible to control the oil discharge by means of the valve so as to secure a smooth and even running of the engine.

According to this invention the decrease of pressure is effected by an increase of the volume of the discharge pipe by a certain amount after the completion of the injection to be again reduced by an equal amount immediately before the beginning of the next injection. Such increase of the volume, according to this invention, may be obtained by means of a plunger reciprocating within the discharge pipe.

In the accompanying drawing, Figure 1 shows a diagrammatic section of a construction according to this invention. Fig. 1ª, shows a horizontal section of part of the construction according to Fig. 1 along the line A—A, Fig. 1. Fig. 2 shows a section of a modified construction. Fig. 3 shows a section at right angles to Fig. 2 of same modified construction.

With reference to Fig. 1, a pump casing 1 contains a pump chamber 2, a suction valve 3, a discharge valve 4, a pump plunger 5, and a guiding block 50 rigidly connected to said plunger 5. The guiding block 50 carries a rotatably mounted anti-friction roller 51 engaged by a cam 6 on the power shaft 60, as is more clearly shown in Fig. 1ª. The cam 6 serves to move the plunger 5 in one direction, while a coiled spring 52 surrounding the plunger 5 and inserted between a suitable surface of the casing and the block 50 serves to move the plunger with its guiding block in the opposite direction. 7 is the casing of the injection valve, 8 is the piston shaped stem of said valve, and 9 is the valve body proper, having a diameter less than that of the stem 8, said valve body engaging a seat formed at one end of the boring of the casing 7. 10 is the discharge pipe of the pump extending from the pump casing 1 and to the injection valve casing 7. Said pipe 10 communicates at one end with a space 11 situated behind the discharge valve 4, and is connected at its other end to a passage 70 formed in the casing 7 and leading to an annular space 71 surrounding the valve body 9. The valve 8, 9 is operated in well known manner in one direction by the oil pressure and in the other direction by a pressure spring 12 clamped between the casing 7 and an angular standard 72 mounted on the casing 7.

Formed in the pump casing 1 is a boring 13 opening into the space 11 and containing a plunger 14, driven in the same way as that above described in connection with the plunger 5, that is, in one direction by a cam 15, preferably, carried by the shaft 60, and in the other direction by a coiled spring 16 surrounding the plunger 13 and inserted between a surface on the casing 1 and the guiding block 17 of the plunger 14.

The cams 6 and 15 are so constructed and arranged relatively to each other that the cam 15 will move the plunger 14 towards the space 11 to thereby decrease the volume of the discharge pipe at the beginning of the injection. Said position of the plunger 15 is maintained during the injection period. The injection being completed, the cam 15 permits the spring 16 to retract the plunger 14 from the space 11, thereby again positively reducing the volume of the discharge pipe to a value, lower than that corresponding to the pressure of the spring 12 thereby enabling the spring 12 to positively press the valve 9 against its seat.

It should be noted that the plunger 14 may be inserted at any point of the discharge pipe, as, for instance, also adjacent to or inside the injection valve chamber. By the means described the pressure reduction may be determined to any appropriate amount, inasmuch as several of the factors on which the magnitude of the pressure reduction depends, may be varied. It is readily seen that such factors are merely the volume of the discharge pipe, the diameter and the length of stroke of the plunger 14, the compressibleness of the oil, and the flexibility of the pipe line.

Fig. 2 shows a modified construction of the invention for use in such engines in which a single fuel supply pump is provided to feed a plurality of cylinders. In this construction, the pump casing 1 contains the single fuel pump plunger 5, the suction valve 3 and the pressure valve 4. The discharge passage formed in the casing 1 comprises a space 11 corresponding to the space 11 in Fig. 1 and an elongated chamber 20 in open communication with the space 11. Extending from the chamber 20 are a plurality of, preferably, parallel passages 21. As is more clearly shown in Fig. 3, each passage 21 is continued by a channel 22, from which extends a pipe 10 corresponding to the pipe 10 in Fig. 1. Each pipe 10 is connected to a valve construction of a design similar to that shown in Fig. 1 and bearing similar reference characters. Each such valve construction belongs to one of the cylinders of the engine.

Inserted in each passage 21 is a valve 23 controlling the connection between the chamber 20 and the respective passage 21. Provided in axial alinement with each passage 21 is a boring 13 containing a plunger 14 corresponding to the plunger 14 in Fig. 1 and each controlled by a cam 15 on the shaft 60, carrying the cam 6 for operating the pump plunger 5.

The arrangement is such that the plungers 14 are operated to open the valves 23 in proper succession to feed the various cylinders with fuel, one valve being opened at each pressure stroke of the plunger 5. At the same time that a plunger 14 opens its corresponding valve 23 it decreases the volume of the respective discharge conduit at the beginning of the injection thereby increasing the pressure in said conduit to such an extent as to permit it to effectively open the valve 8, 9. After the injection is completed the plunger 14 is restored thereby increasing the volume of the respective discharge conduit to lower the pressure in said conduit to such a value as to permit the spring 12 to positively restore the valve 8, 9 against its seat.

What I claim is:—

1. In a fuel supplying device for internal combustion oil engines, the combination with a fuel pump, comprising a casing, a plunger, a suction valve, a discharge conduit and a discharge valve in the latter, of a fuel injecting valve to be opened by the pressure within said discharge conduit and closed by a flexible member, an additional plunger operating beyond said discharge valve, and means for controlling said additional plunger to maintain same against movement during the whole discharge period of the fuel pump plunger and cause it immediately at the completion of said period or subsequent thereto to effect a certain reduction of the pressure existing beyond the discharge valve to allow the fuel injecting valve to be positively pressed against its seat by the said flexible member.

2. In a fuel supplying device for internal combustion oil engines, the combination with a fuel pump, comprising a casing, a plunger, a suction valve, a discharge valve, and a discharge conduit, of a fuel injecting valve to be opened by the pressure within said discharge conduit and closed by a flexible member, an additional plunger operating in a chamber in said casing in communication with said discharge conduit and means for controlling said additional plunger to maintain same against movement during the whole discharge period of the fuel pump plunger and cause it immediately at the completion of said period or subsequent thereto to effect a certain reduction of the pressure existing in the discharge conduit to allow the fuel injecting valve to be positively pressed against its seat by the said flexible member.

3. A fuel supplying device for multi-cylinder internal combustion oil engines, comprising in combination a single fuel pump to feed all of the cylinders of the engine by way of a common discharge chamber, a fuel injecting valve for each such cylinder, a discharge conduit between said discharge chamber and each injecting valve, a valve to control the connection between said discharge chamber and each such conduit, a plunger to control each such last-mentioned valve, said plungers being arranged so as to decrease the volume of the respective conduits in opening the valves, and to increase said volume in closing the valves, as and for the purpose set forth.

In testimony whereof I have signed my name.

KNUT JONAS ELIAS HESSELMAN.